(12) United States Patent
Solheim

(10) Patent No.: US 6,589,017 B1
(45) Date of Patent: Jul. 8, 2003

(54) AIRCRAFT AIRFOIL ASSEMBLY AND METHOD

(76) Inventor: Russell G. Solheim, 1100 Indiana St., Racine, WI (US) 53405

( * ) Notice: Subject to any disclaimer, the term of this patent is extended or adjusted under 35 U.S.C. 154(b) by 52 days.

(21) Appl. No.: 09/752,239

(22) Filed: Jan. 2, 2001

(51) Int. Cl.[7] ............................................. B64C 11/28
(52) U.S. Cl. ........................ 416/87; 416/88; 244/199; 244/7 A; 244/17.11
(58) Field of Search .................. 244/199, 91, 17.27, 244/17.25, 17.11, 6, 7 A, 130; 416/87, 88, 89

(56) References Cited

U.S. PATENT DOCUMENTS

| | | | | |
|---|---|---|---|---|
| 1,478,063 A | * | 12/1923 | Schiesari | |
| 1,491,972 A | * | 4/1924 | Schiesari | |
| 1,855,084 A | * | 4/1932 | Alvistur | |
| 2,008,843 A | * | 7/1935 | Smith | |
| 2,576,981 A | * | 12/1951 | Vogt | |
| 4,440,361 A | * | 4/1984 | McGann | |
| 4,589,611 A | * | 5/1986 | Ramme et al. | |
| 4,605,183 A | * | 8/1986 | Gabriel | |
| 4,714,215 A | * | 12/1987 | Jupp et al. | |
| 5,199,849 A | * | 4/1993 | Leman | |

* cited by examiner

*Primary Examiner*—Tien Dinh
(74) *Attorney, Agent, or Firm*—Arthur J. Hansmann

(57) ABSTRACT

An aircraft rotatable airfoil assembly in the nature of a helicopter machine and having two airfoils diametrically disposed about an axis of rotation. Air baffles are mounted on the radially inner and radially outer ends of the airfoils and for blocking the vortices inherently generated by the orbiting of the airfoils. The baffles thereby avoid vortices which reduce the lift force on the aircraft by eliminating the air flow from under the airfoil to above the airfoil and around the airfoil inner and outer ends. The assembly can be included in an airliner or an automobile. The aircraft is arranged for vertical and horizontal flight.

4 Claims, 5 Drawing Sheets

AIRCRAFT AIRFOIL ASSEMBLY AND METHOD

BACKGROUND OF THE INVENTION

This invention is particularly adaptable to an airfoil or blade which is useful for a helicopter, gyrocopter, or like aircraft where there is an airfoil or blade that orbits an axis on the aircraft. Further, this invention is applicable to airfoils which are supported on the aircraft and are in fact disposed only at a distance from the body or fuselage for orbiting same. In those aircraft, there is a foreshortened airfoil or blade, such as shown in U.S. Pat. No. 2,996,121 to Stub, as compared to the usual helicopter blade which has an extent from the fuselage to the radially outer tip of the blade.

Therefore, the airfoil span, which is its length along the orbiting radius, is short compared to the airfoil chord, which is its depth transverse to the span. As with the Stub arrangement, the airfoil of this invention is supported on cables which extend from the body or fuselage and thereby position the airfoil in response to centrifugal force acting on the orbiting airfoil. In that environment, the airfoil creates vortices, which are air currents moving from underneath the airfoil to above the air foil, and those vortices impede the air lift otherwise available to the airfoil because the air pressure is increased above the airfoil and decreased beneath the air foil because of the vortices.

The present invention overcomes the aforementioned problem and it does so in an efficient and economical manner in an aircraft which produces both vertical and forward flight. In this regard, the airfoil of this invention has a relatively low aspect ratio, that is, the ratio of the span to the chord, and the vortices problem is overcome by the application of shields or baffles at the radially inner and outer ends of the airfoil.

Another object of this invention is to provide an aircraft which is efficient in flight but employs only a minimum of material, such as wing or airfoil material, and has only a minimum weight, and occupies only a minimum space when not in flight.

With an airfoil having a low aspect ratio, as in this invention, the air currents at the ends of the airfoil are very significant and thus there is concern about the vortex at the airfoil ends. The orbiting airfoil inherently generates vortices which cause the air pressure to lessen below the airfoil and to increase above the airfoil, thus impeding the air lift desired. The lift varies according to the square of the velocity of the air passing over and under the airfoil. The speed of the radially outer tip of an airfoil is the fastest linear speed of the airfoil. Thus a very large lift can be generated at the tips of rotors or airfoils, and especially so when the vortex is negated, as in this invention.

DETAILED DESCRIPTION OF A PREFERRED EMBODIMENT AND METHOD

Figure 1:
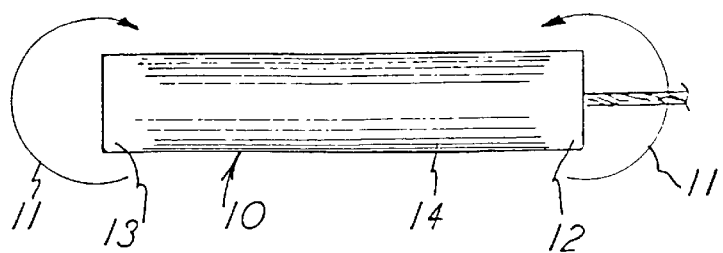
FIG. 1 is a front elevational view of an incomplete airfoil of this invention.

FIG. 1 shows an airfoil 10 and vortices are indicated by the arrows 11 at the radially inner end 12 and the radially outer end 13. Thus, with the airfoil or blade 10 in flight, it inherently generates the vortices 11 by the vortex feature of an airfoil with ambient air passing therearound. The vortices or air currents generated move from underneath the airfoil body 14 to the indicated location above the body 14 and thus lower the air pressure below the airfoil 10 and increase the air pressure above the airfoil 10, both pressures being undesirable because the lift force is thereby lessened.

Figure 2:
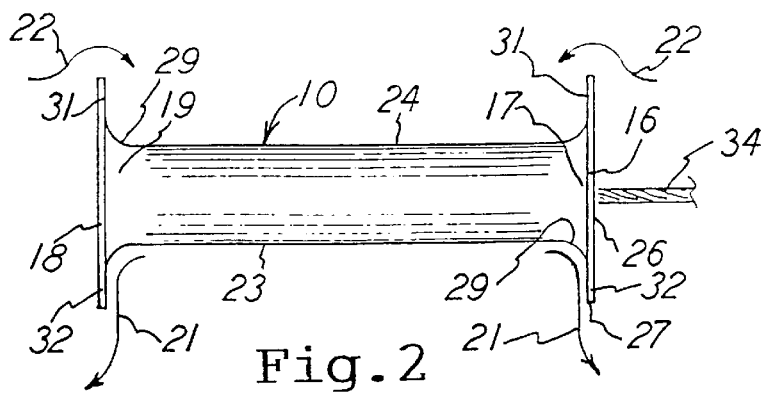
FIG. 2 is a front elevational view of a complete airfoil of this invention.
Figure 3:
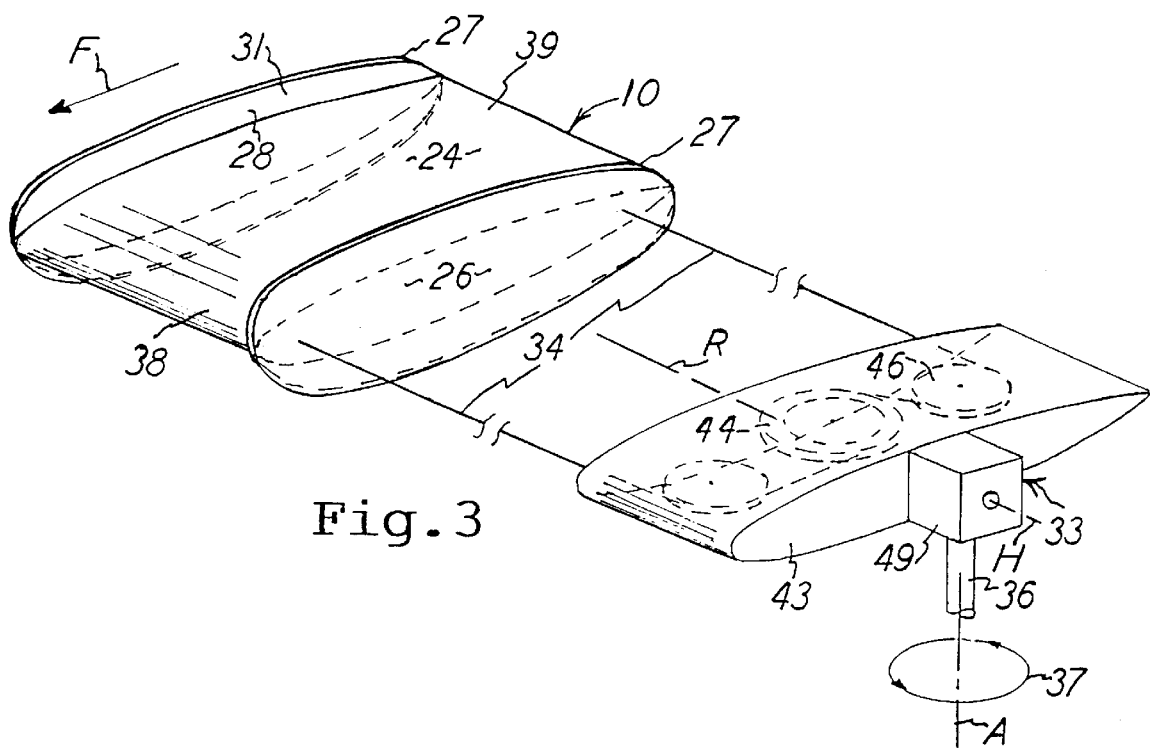
FIG. 3 is a perspective view of an airfoil of this invention and with additional parts shown related thereto.

FIGS. 2 and 3 show the airfoil 10 now with a baffle or shield 16 integral thereon at the radially inner end 17 of the airfoil, and they show the baffle or shield 18 integral with the radially outer end 19 of the airfoil. FIG. 2 then further shows that there are no vortices but instead there is air flow per the arrows 21 and 22. That is, the air flow per arrow.21 does not go from the lower surface 23 of the body 14 to the upper surface 24 of the body 14. As such, there are no vortices and their attending detrimental effect as mentioned herein.

Thus the airfoil body 14 is planar and is configured and disposed substantially horizontally. The baffles 16 and 18 are planar and they are narrow plates and they are disposed substantially vertically, which is transverse to the body 14. They are rigid members capable of retaining their shown configuration without deflecting under the full air pressure generated during flight. The baffles 16 and 18 have an uprightly disposed outer surface 26 and a narrow thickness 27 which is only approximately one-twentieth of the total height of the baffle outer surface 26. The baffles 16 and 18 also have interior upright surfaces 28, and there are fillets 29, shown only in FIG. 2, which blend with the body 14 to have the baffles 16 and 18 integral with the body 14.

The baffles or shields have upper portions 31 and lower portions 32 relative to the planar configuration of the body 14. The airfoil 10 has a height as seen in FIG. 2 between the surfaces 23 and 24, and the baffle portions 31 and 32 extend beyond those respective surfaces 23 and 24 a distance approximately the height of the airfoil. Thus the lower portions 32 preclude the vortices flow away from the body under surface 23 and toward the body upper surface 24, and thy upper portions 31 preclude that vortices flow onto the body upper surface 24.

Figure 9:
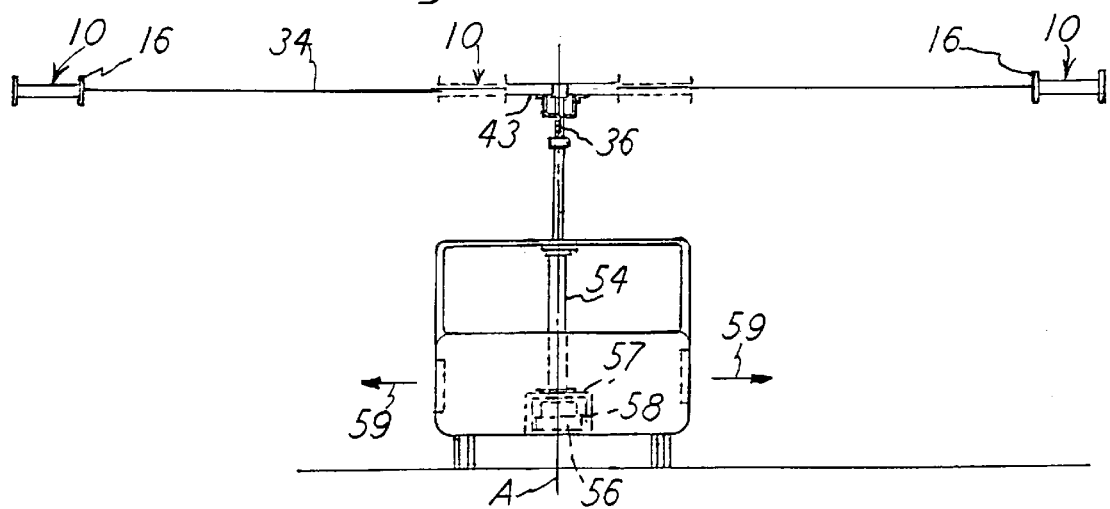
FIG. 9 is a front elevational view of FIG. 8.

FIG. 3 shows the assembled airfoil 10 attached to a rotation mechanism 33 through the connections with two flexible cables 34. The mechanism has an uprightly disposed rotatable hollow splined mast 36 which is rotated from any suitable rotation drive below it. The rotation is in the direction of the arrow 37 and is about an upright axis A which is the upright central axis of the body of the aircraft itself, as seen in FIG. 9. That rotation about axis A creates orbital movement of the airfoils 10 in the direction of the arrow F, and that is with the length of the radius R between the axis A and the airfoils 10, and the radius is parallel to the extent of the cables 34.

It will also be seen that each airfoil body 10 is shaped to have an aerodynamic larger nose front end 38 compared to the body rear end 39 which is streamlined. Also, the airfoil span dimension S, which is parallel to the radius R, is less than the airfoil chord dimension C, which is parallel to the planes of the baffles 16 and 18. The dimensions are such that the aspect ratio can be a low as 0.40. Slightly different ratio relationships are shown among FIGS. 4, 7, and 8 where top views are displayed.

Figure 4:
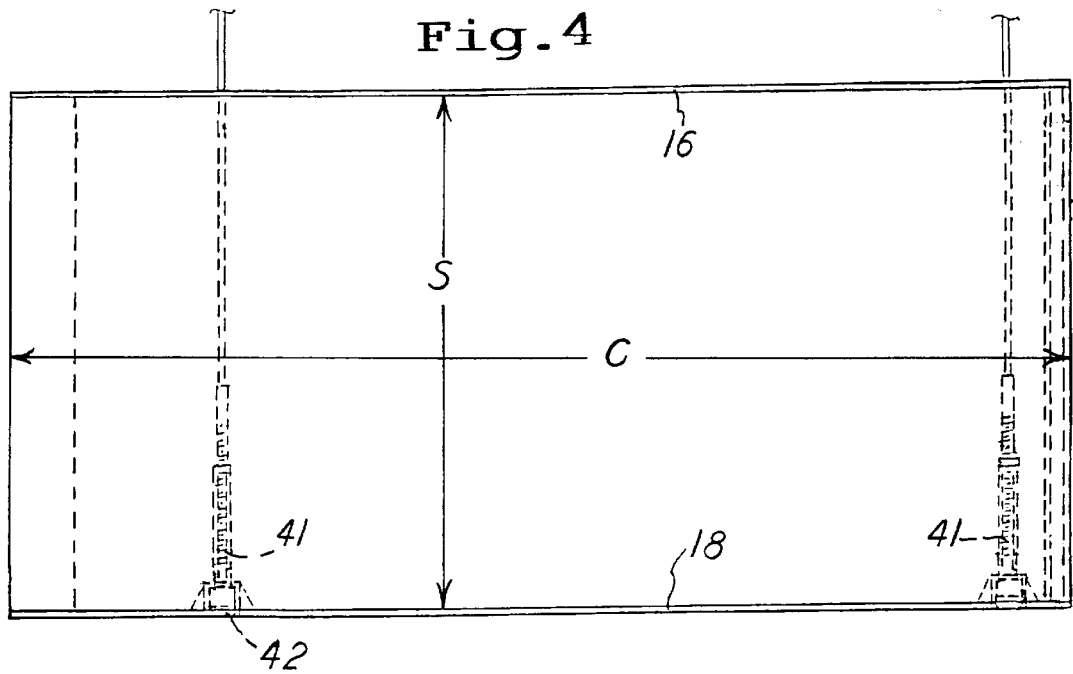
FIG. 4 is a top plan view of an airfoil of this invention with parts shown attached thereto.
Figure 5:
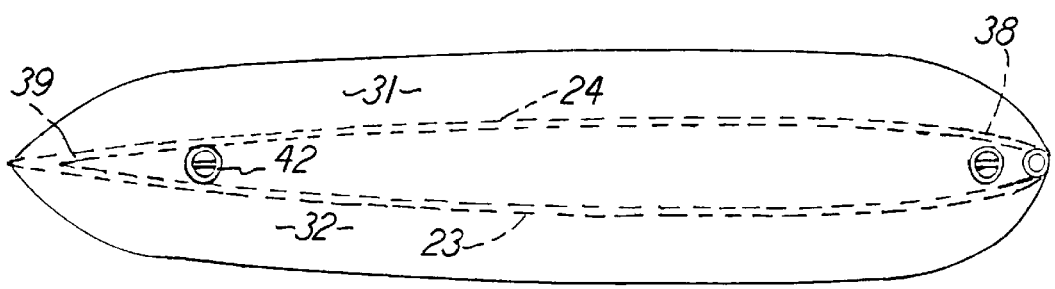
FIG. 5 is a side elevational view of FIG. 4.
Figure 6:
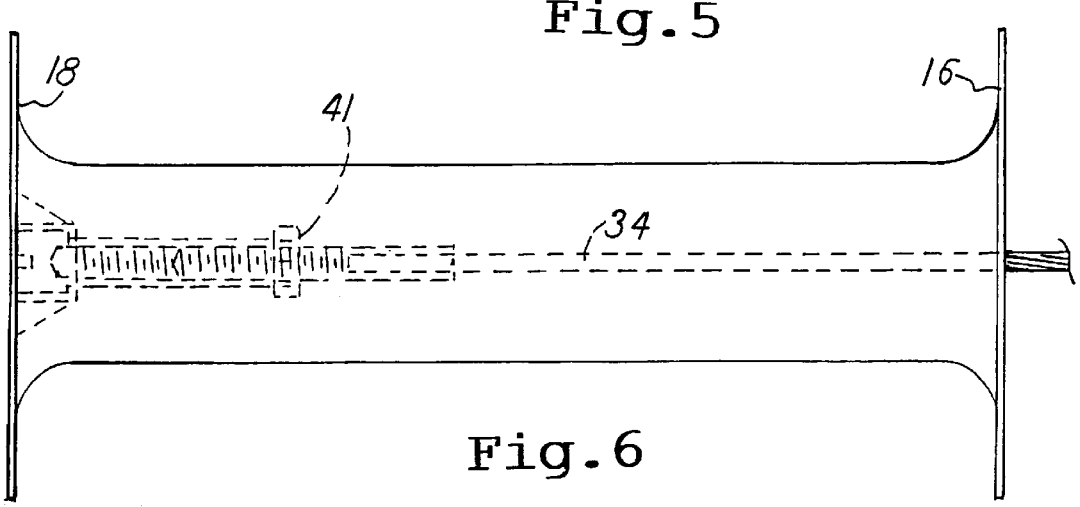
FIG. 6 is a front elevational view of FIG. 4.

FIGS. 4 and 6 show that each of the two cables 34 are separately adjustably connected to the airfoil 10 by the threaded connections at 41, and an exterior screw connection 42 is available for making the threaded adjustments to set the tension in each of the cables 34.

Figure 7:
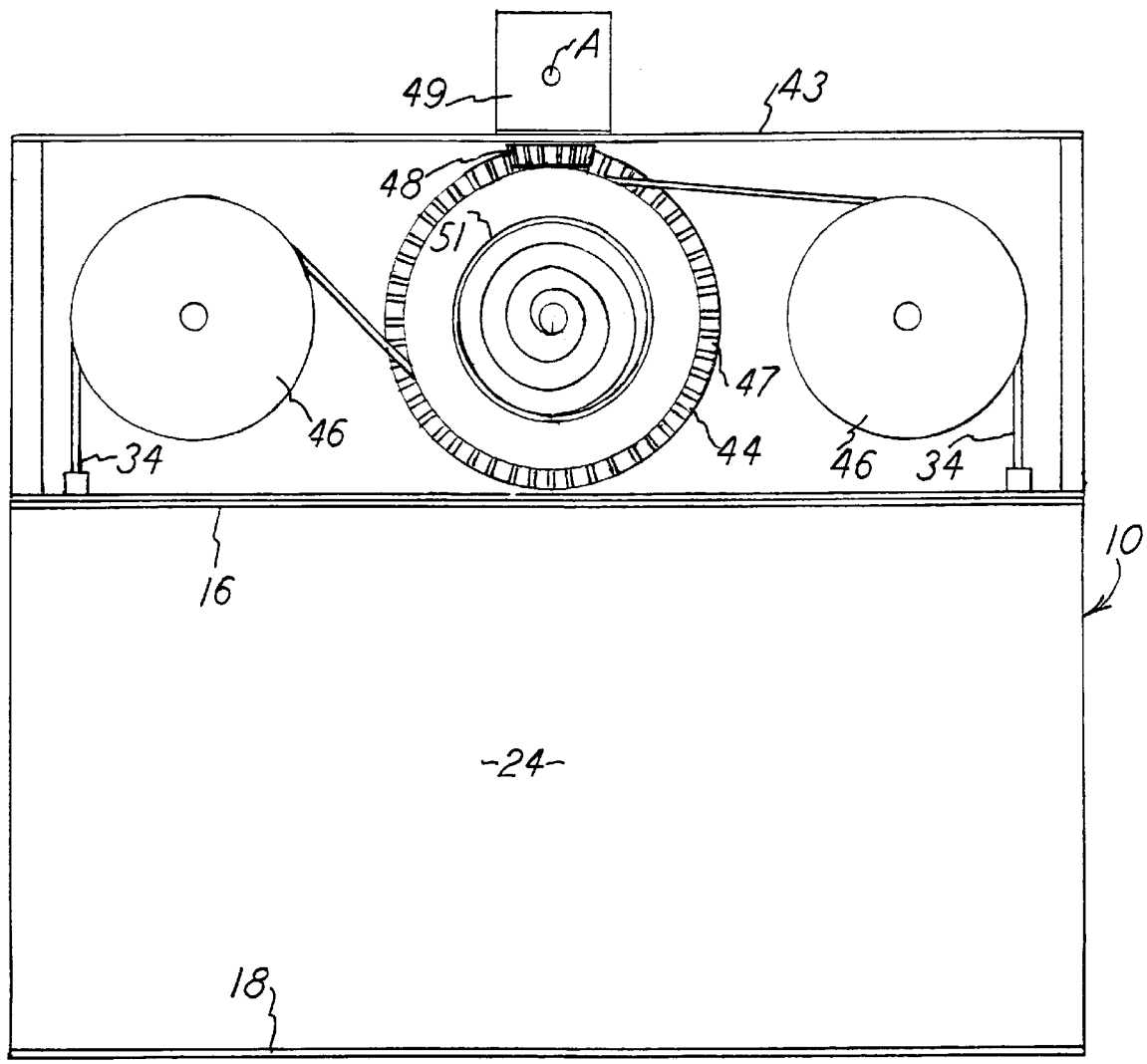
FIG. 7 is a top plan view of an airfoil of this invention shown with other parts attached thereto.

FIGS. 3, 7, and 9 show that the rotation mechanism 33 includes a housing 43 in which a cable reel 44 is rotatably mounted along with two pulleys 46. The three axes of rotation are all parallel to each other and substantially so relative to the axis A when in non-flying angle of attack. The two cables 34 are wrapped onto the reel 44 in the same rotation direction relative to each other, and the respective cables are respectively trained over the pulleys 46. Bevel gear teeth 47 are on the reel 44, and a bevel pinion 48 is rotatably driven by suitable drive connection out of the gear box 49 which is at the top of the hollow drive splined mast 36. Gears 47 and 48 are to only provide a small torque to reel 44.

Figure 8:
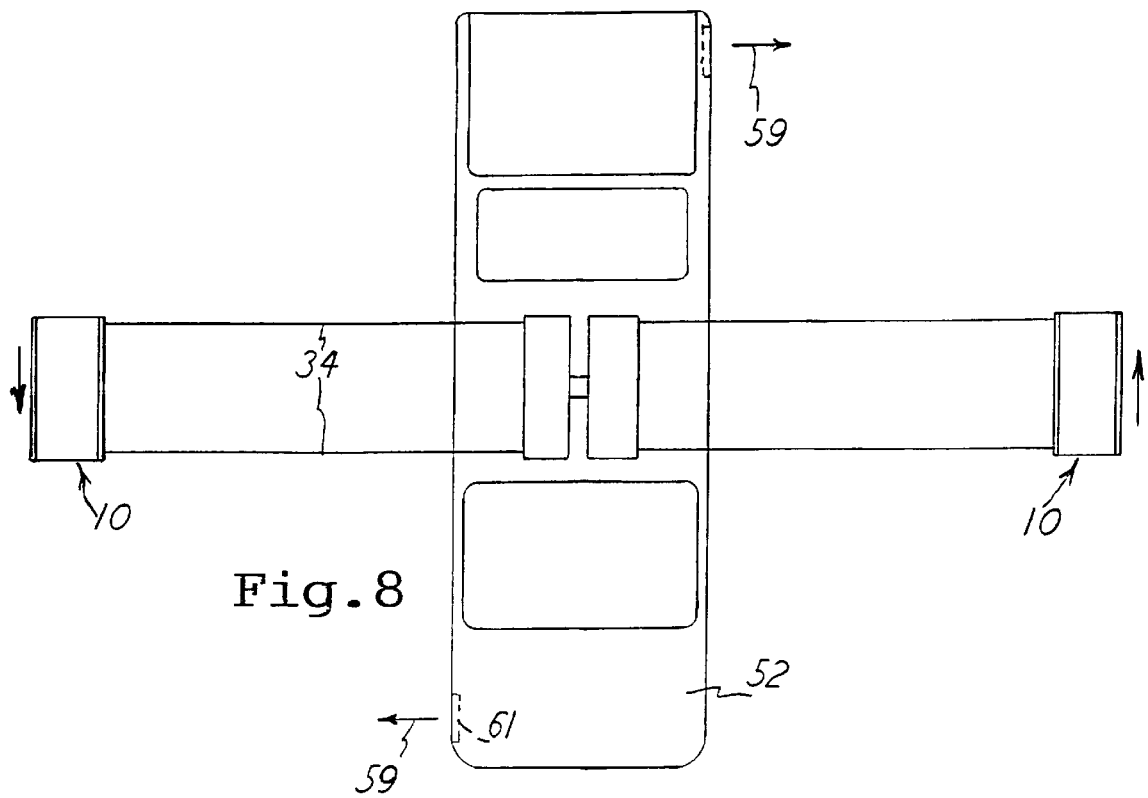
FIG. 8 is a top plan view showing this invention applied to an automobile.

With that arrangement, rotation of the hollow splined mast 36 and the box 49 in the direction 37 will induce rotation of the housing 43 in the direction F. In the inoperative position of FIG. 7, the airfoil 10 is adjacent the housing 43, but, with sufficient speed of rotation and the consequent centrifugal force thereby generated, the airfoil 10 will move radially outwardly along the radius R and away from the housing 43 to the air flight and operative position, such as shown in FIGS. 8 and 9. In that action, the cables 34 unwrap relative to the reel 44 and move over the pulleys 46 and extend outwardly, such as indicated in FIGS. 3, 8, and 9. There is a coil spring 51 attached to the reel and suitably anchored to thereby serve the function of re-wrapping the cables onto the reel when rotational speed is decreased and eventually stopped. The spring 51 thus is always acting counter to the centrifugal force induced by the rotation.

The position of the pulleys 46 and the attachment of the cables to the airfoils 10 are arranged to have the threaded attachments located at the respectively leading and trailing edges of the airfoil, as shown.

Figure 10:
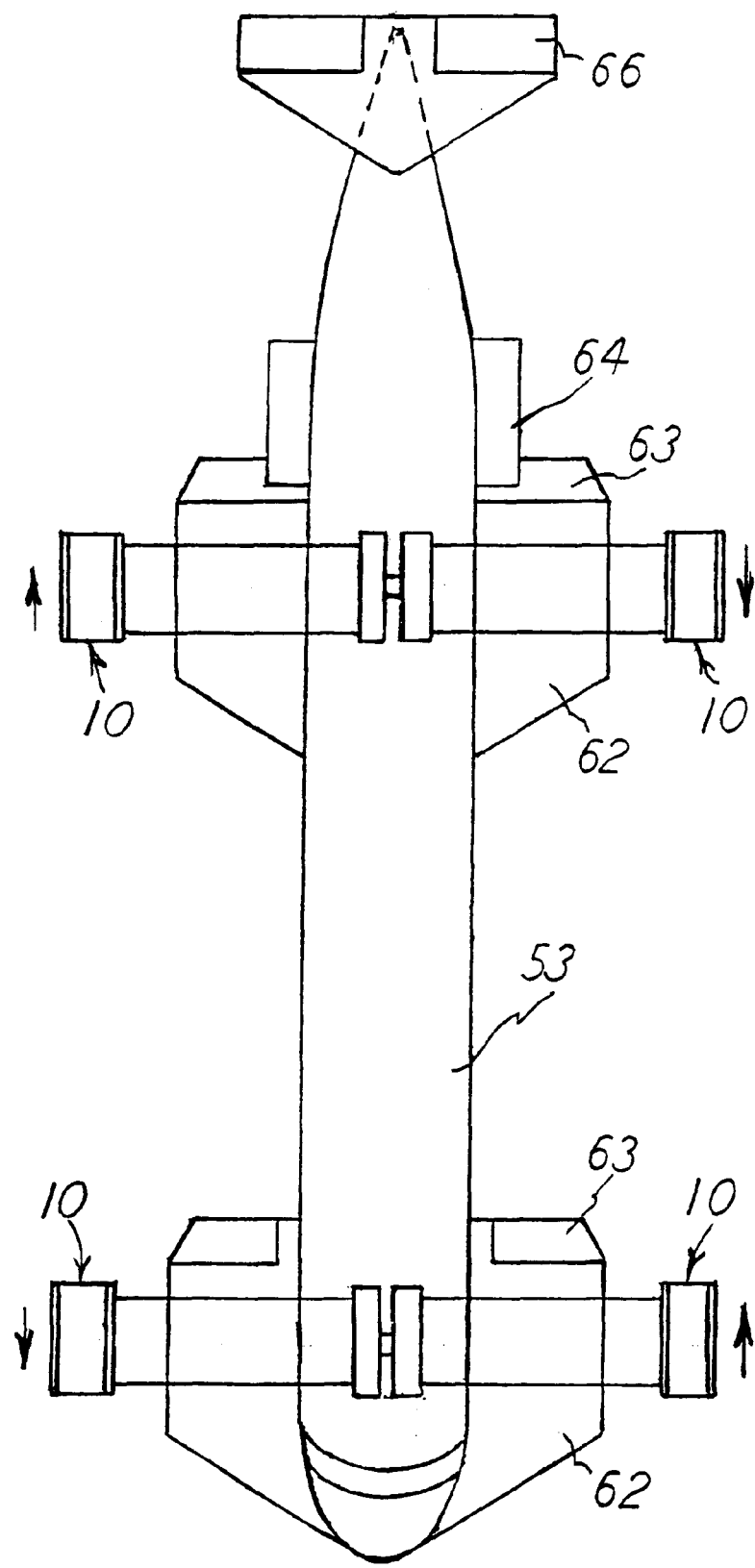
FIG. 10 is a top plan view showing this invention applied to an airliner.

FIGS. 8, 9, and 10 show that the assembly heretofore described exists on both sides of an aircraft body, being an automobile 52 in FIGS. 8 and 9, and an airliner body 53 in FIG. 10. Also, there two sets of each assembly, namely, one on each side of the respective aircraft body, and FIG. 10 further shows two of each set of the entire assembly, with rotation being in the directions indicated and which are opposite from each other for force balancing purposes.

The hollow splined mast 36 is vertically adjustable by telescoping with a hollow splined cylindrical mast 54 to thereby elevate the assemblies relative to the respective aircraft bodies 52 and 53. Also an auxiliary power spring 56 and auxiliary motor 57 at the bottom of the mast 54 and their shown housing 58 rotate with the mast. Power is absorbed or released through their common axis shaft through the center of the mast 54 to the gears in the box 49.

FIG. 8 and 9 show air streams 59 suitably provided by unshown fans, which will be at 61, in the aircraft bodies to direct air to oppose the torque of the rotors, being the assemblies described. Also, FIG. 10 shows conventional wings 62, ailerons 63, jets engines 64, and elevators 66.

One skilled in the art knows that an unshown assembly of push rods and a swash plate is employed for establishing desired airfoil pitch when in flight. In that arrangement, the two airfoils can be set to an angle of attack which is the same on each side of the rotation or orbital axis for collective control of the airfoils. Also, there is the airfoil cyclic control effected by that known arrangement to thereby provide the horizontal component of flight.

With the cables 34 disposed at the fore-and-aft extremities of each airfoil, there is no airfoil flutter. The housing 43 pivots about the horizontal axis H, under the control of the unshown but usual push rod and swash plate assembly mentioned. With the low aspect ratio disclosed herein, there is only a minimum of flight noise.

The invention provides for one flight pattern by radially extended deployment of the airfoils 10 under centrifugal force, then there can be vertical take-off and flight by means of the airfoils 10 and appropriately setting their pitch, then there can be horizontal flight by means of the wings 62 and the jet engines 64 and that can be with the airfoils radially retracted. Reversing that sequence by throttling the jet engines 64 and again orbitally moving and extending the airfoils 10 can effect the vertical landing of the aircraft.

What is claimed is:

1. A helicopter rotatable airfoil assembly comprising:

an aircraft body, a rotation mechanism rotatably supported on said body and presenting an upright axis of rotation, two airfoils with each one thereof disposed on a respectively diametrically opposite side of said axis and having a planar configuration extending in a substantially horizontal plane and with each one of said airfoils having an end disposed radially inwardly and an end disposed radially outwardly with respect to said axis, two air vortex baffles rigidly affixed to each of said airfoils with one of said baffles respectively disposed at and on each said end of each said airfoil and with each of said baffles rigidly extending continuously solidly from and above and below said horizontal plane and beyond said planar configuration of each said airfoil in a substantially and respectively vertical plane to thereby restrict air flight vortices action at both said ends of each said airfoils, each said vortex baffle is a flat and narrow member and extends in the vertical plane both above and below said horizontal plane, each of said airfoils has a span dimension extending radially relative to said axis and a chord dimension extending transverse to said span dimension and with the numerical ratio of said span dimension to said chord dimension having an aspect ratio less than the numerical value of one, and two flexible cables connected to each of said airfoils and to said rotation mechanism and being horizontally extendable from said rotation mechanism and arranged to induce orbiting of said airfoils about said axis upon rotation of said rotation mechanism and thereby move said airfoils radially outwardly from said axis under centrifugal force acting on the orbiting said airfoils.

2. The aircraft rotatable airfoil assembly as claimed in claim 1, wherein:

said aspect ratio of each of said airfoils is within the range of 0.4 to 1.0.

3. The aircraft rotatable airfoil assembly as claimed in claim 1, including:

said cables having first ends disposed radially inwardly relative to said axis and second ends disposed radially outwardly relative to said axis, a cable pulley system mounted on said body and including a circular cable reel and two pulleys and with said reel and said two pulleys each having a rotation support and a rotation axis parallel to each other, said cable first ends being anchored to and wrapped around said reel in one common circular direction relative to the wrapping of each and said rotation axis of said reel and being respectively trained over said pulleys for simultaneous extension and retraction relative to said body, and said cable second ends being adjustably connected to a respective one of said airfoils, all being arranged for the same radially outward and radially inward movement of said two airfoils relative to said body axis.

4. An aircraft rotatable airfoil assembly comprising:

an aircraft body, a rotation mechanism rotatably supported on said body and presenting an axis of rotation, two airfoils with each one thereof disposed on a respective diametrically opposite side of said axis for orbiting therearound and having a planar configuration extending in a first plane and with each one of said airfoils having an end disposed radially inwardly and an end disposed radially outwardly with respect to said axis and with said airfoils each having a span dimension extending in the radial direction and a chord dimension extending in a direction transverse to the radial direction and with said span having a total dimension less than the total dimension of said chord and with said airfoils each having a leading extremity and a trailing extremity relative to the orbiting direction of said airfoils, an air vortex baffle respectively rigidly affixed on each said radially inwardly end and said radially outwardly end of each said airfoil and with each said vortex baffle rigidly extending beyond said planar configuration of each said airfoil in a second plane substantially transverse to said first plane and being arranged to simultaneously restrict air flight vortices action at said ends of said airfoils, the aspect ratio of said span compared to said chord is less than a numerical amount of one and said airfoil is thereby arranged to have a long traverse of air over the airfoil, and be free of vortices, and thereby reduce the noise of flying, and a flexible cable connected between said rotation mechanism and respective ones of said leading and said trailing extremities of each said airfoil and with each said cable being arranged to orbitally support said airfoil relative to said aircraft body upon rotation of said rotation mechanism.

* * * * *